July 26, 1966 W. GROBE 3,263,134

MAGNETIC LATCHING RELAY

Filed Dec. 20, 1963 3 Sheets-Sheet 1

INVENTOR

W. GROBE

BY [signature]

ATTORNEY

July 26, 1966 W. GROBE 3,263,134

MAGNETIC LATCHING RELAY

Filed Dec. 20, 1963 3 Sheets-Sheet 2

INVENTOR

W. GROBE

BY [signature]

ATTORNEY

July 26, 1966 W. GROBE 3,263,134

MAGNETIC LATCHING RELAY

Filed Dec. 20, 1963 3 Sheets-Sheet 3

INVENTOR

W. GROBE

BY [signature]

ATTORNEY

United States Patent Office
3,263,134
Patented July 26, 1966

3,263,134
MAGNETIC LATCHING RELAY

Wolfgang Grobe, Ludwigsburg, Germany, assignor to International Standard Electric Corporation, New York, N.Y., a corporation of Delaware Filed Dec. 20, 1963, Ser. No. 332,179
Claims priority, application Germany, Jan. 12, 1963, St 20,168
9 Claims. (Cl. 317—172)

Figure 1:
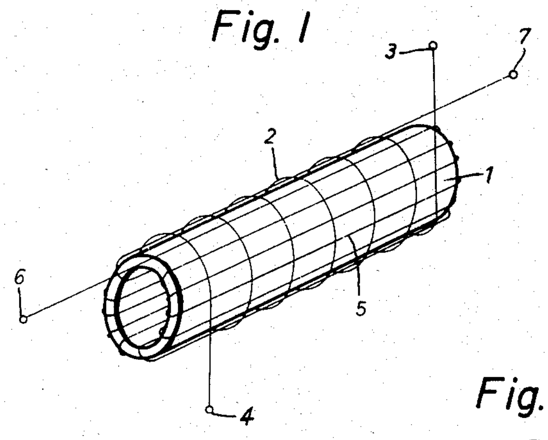

This invention relates in general to magnetic latching relays and in particular to arrangements for insuring the positive release of relays of this character.

A magnetic latching relay usually consists of a magnetic circuit having an operating airgap which is bridged by an armature and which is continually traversed by a relatively weak magnetic flux from a flux source such as a permanent magnet. This weak flux is usually insufficient to operate the armature but is of sufficient strength to maintain the armature in its operated position after it is operated. A counter flux source is usually employed to counteract the holding flux when the armature is to be released.

These known relays have the disadvantage that the strength of the holding magnetic flux must lie within narrow limits else the armature will be operated prematurely or difficulty will be encountered in releasing the armature by the counter flux source. These relays have the further disadvantage that the armatures are affected by the counter flux source, which is usually a separate coil winding. Such a coil winding must have a sufficient number of ampere turns to cause the armature of the relays to release by counteracting the permanent magnet flux yet must not be too great else it will generate a flux sufficient to overcome the flux from the permanent magnetic source and restore the armature and then reoperate it. This is particularly true in reed-type relays wherein a permanent magnet is provided on one contact and an energizing coil is associated with another contact. Further, manufacturing tolerances will adversely affect the operation and release characteristics. This places a further restriction on the admissible ranges of flux amplitude.

Other known latching relays utilize two permanent magnets polarized in the same sense with the release of the relay being effected by changing the polarity of one of the magnets. These relays have and need a compensating winding which maintains the resultant flux at zero level when the relays are de-energized. The disadvantage of these relays is that the re-magnetizing flux can cause an over-compensation.

The foregoing disadvantages are overcome by the present invention wherein a permanent magnet is composed of several parts or may also consist of one part which only later on is brought into the final shape of the magnet, with the individual parts of said permanent magnet being magnetized transversely in relation to the original direction of magnetization whenever the magnetic flux through the airgaps is to become substantially zero.

According to one embodiment of the invention, the permanent magnet is positioned with respect to the remaining flux-conducting parts of the relay so that the magnetic field of the permanent magnet is symmetrized in the transversely magnetized condition with respect to the operating airgap.

Still a further embodiment of the invention uses a permanent magnet consisting of a thin tape of a permanent magnetic material which is wound in the form of a hollow body having a sufficient thickness.

The material of the permanent magnet may have a hysteresis curve of rectangular shape and a suitable coercive force.

According to a further embodiment of the invention, the coil for effecting the cross magnetization comprises a single winding which may have a circular cross-section extending within the permanent magnet sleeve.

A feature resides in the arrangement wherein the permanent magnet serves as the conductor for the cross-magnetizing current.

The present invention has the advantage that by the remagnetization of the magnet in the cross direction and a subsequent demagnetization (which can be achieved at the same time, for example, by a decaying oscillation in a cross-magnetizing coil), from a practical standpoint, the residual flux in the airgap is caused to disappear completely. This demagnetization feature is not present in the conventional types of arrangements.

Figure 9:
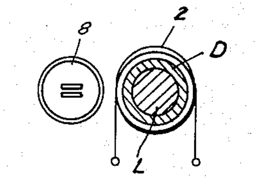
Figure 9A:
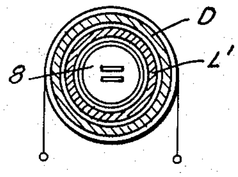
Figure 2:
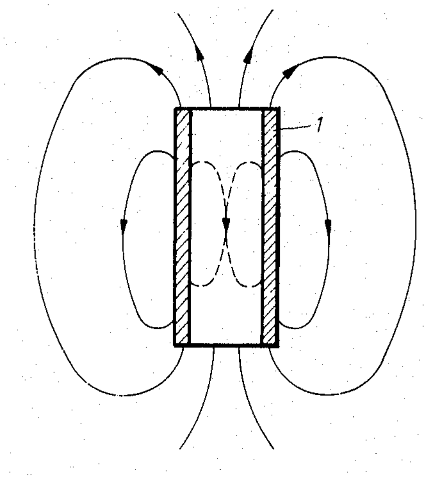
Figure 2A:
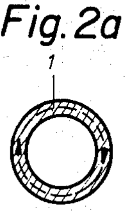
Figure 10:
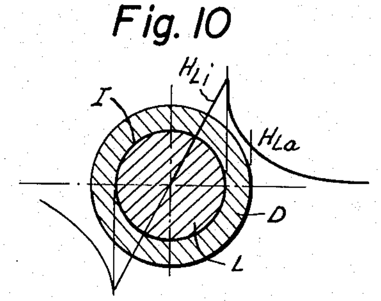
Figure 11:
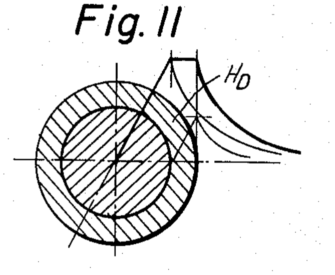
Figure 3:
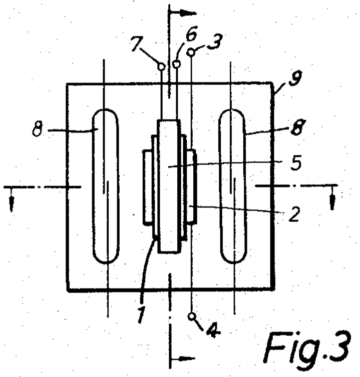
Figure 3A:
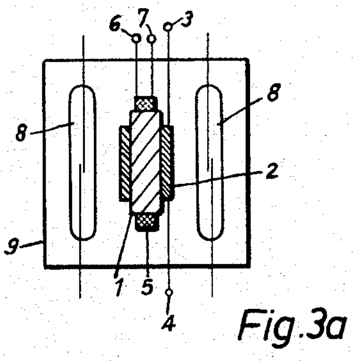
Figure 3B:
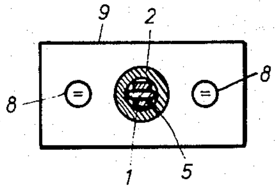
Figure 4:
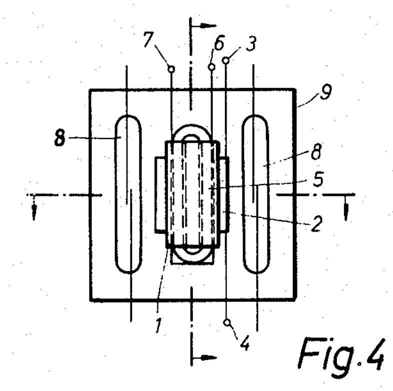
Figure 4A:
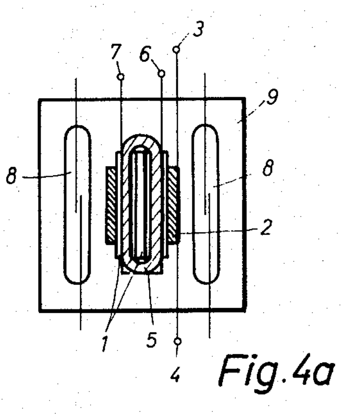
Figure 4B:
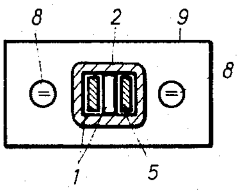
Figure 5:
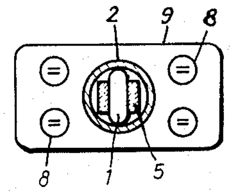
Figure 5A:
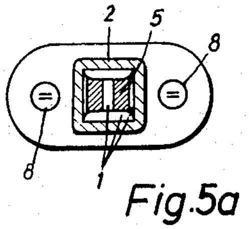
Figure 5B:
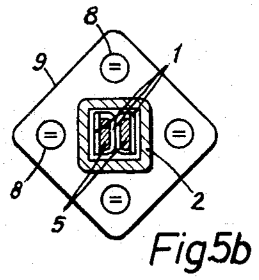
Figure 6:
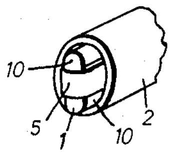
Figure 6A:
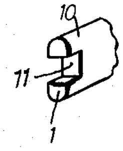
Figure 6B:
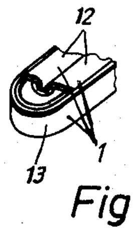
Figure 7:
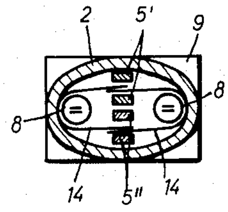
Figure 7A:
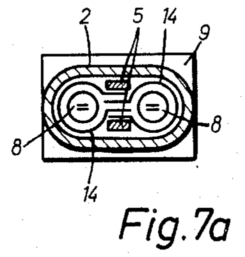
Figure 8:
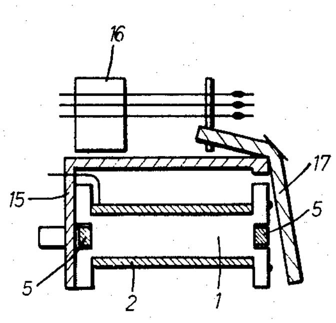
Figure 8A:
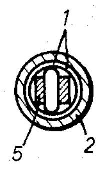
Figure 8B:
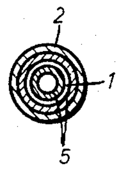

The invention will now be explained in detail with reference to FIGS. 1–11 of the accompanying drawings, in which:

FIG. 1 shows a cylindrical permanent magnet having a longitudinal winding and a transverse or cross winding, FIGS. 2 and 2*a* show a representation of a longitudinal and a cross-sectional view, respectively, of the permanent magnet of FIG. 1;

FIGS. 3, 3*a* and 3*b* show various views of the permanent magnet of FIG. 1 associated with reed contacts;

FIGS. 4, 4*a* and 4*b* show an arrangement similar to that shown in FIG. 3, with the permanent magnetic body having a closed cross-magnetizing flux;

FIGS. 5, 5*a* and 5*b* show other examples of the arrangement as shown in FIGS. 3 and 4;

FIGS. 6, 6*a* and 6*b* show details of the permanent magnet body shown in FIG. 1;

FIGS. 7 and 7*a* show reed contacts of different shapes with differently arranged permanent magnets;

FIG. 8 shows a relay having a core consisting of a cross-magnetizable permanent magnet;

FIGS. 8*a* and 8*b* show cross-sectional views of the permanent magnets and windings of the core section shown in FIG. 8;

FIGS. 9 and 9*a* show examples of a sleeve-shaped permanent magnet having reed contacts arranged both on the inside and the outside of the permanent magnet; and FIGS. 10 and 11 show a representation of the tangential field intensity of the arrangements according to FIG. 10.

Referring now to FIG. 1, sleeve-shaped permanent magnet 1, which is made of a suitable magnetic material, has a winding 2 extending transversely in relation to the longitudinal direction of the sleeve. The winding 2 has terminals 3 and 4. Also, magnet 1 has a winding 5 lying in the longitudinal direction of the sleeve. The winding 5 has winding terminals 6 and 7. The winding 2, extending over the smallest cross-section of the core and over a suitable portion of the length of the magnet, serves to magnetize the core in the axial direction under current-flux conditions, which magnetic flux direction is shown in FIG. 2. The winding 5 encloses the core in its longitudinal direction, and causes a circular magnetization of the core under current-flux conditions, in such a way that there will result a magnetic flux as shown in FIG. 2*a*.

FIGS. 3 to 7 show several examples of the practical application of a longitudinally and cross-magnetizable core 1 when associated with well-known reed contacts.

FIGS. 3, 3*a* and 3*b* show two different sectional views and a top view respectively. The winding 5 encloses the core 1 in its longitudinal direction and, under current-flux conditions, magnetizes the core 1 in the transverse or cross direction so that the longitudinal sides become poles. The flux will find its return path over the screening 9, without a noteworthy flux component passing through the operating airgaps of the iron circuits, which for example, may comprise reed contacts. The winding 2 extends over the smallest cross-section of the core 1, over a suitable portion of the length of the magnet, and magnetizes the core 1 in the longitudinal direction under current-flux conditions. The resulting flux is completed, among others, via the reed contacts 8 and causes these contacts to close or respond. The screening 9 conducts a stray or leakage (magnetic) flux parallel in relation to the useful flux and may therefore not be positioned too close to the core, whereas the latter is desirable in the case of a cross-magnetized core.

Most appropriately, therefore, as shown in FIG. 4, the core's flux is provided with a path which is closed in itself. The return flux around the coil 5 facilitates the circular saturation (vertically in relation to the longitudinal axis of the core 1) and simultaneously reduces the stray field of the release flux considerably. In this way, the cross magnetization annuls the effects of the permanent magnet upon the operating airgaps.

Of course, instead of reed contacts 8 it is also possible to employ other kinds of flux-conducting elements at one or more parallel- or series-arranged longitudinal and cross-magnetizable permanent magnetic cores 1.

FIGS. 5, *5a* and *5b* show examples of various embodiments wherein the permanent magnetic core 1 again simultaneously serves as a coil body for both the winding 2 and the winding 5.

FIGS. 6, *6a* and *6b* show details relating to the examples of the magnetic core 1 and associated windings shown in FIGS. 5, *5a* and *5b*.

The face sides of the core 1 each include flanges 10 and grooves 11. In the case of a hollow cylinder the flanges 10 and the grooves 11 may be provided in a similar way. As may be seen best in FIG. *6b*, the core 1 may consist of U-shaped sheetmetal members 12 and tapes 13 made from permanent magnetic material.

FIGS. 7 and *7a* show two examples in which the core 1 is replaced by two sleeves 14 which are arranged to encircle the reed contacts. The coil for effecting the cross-magnetization is sub-divided into two halves 5' and 5'' as seen most clearly in FIG. 7.

FIG. *7a* shows a design comprising a two-part sleeve 14 acting as the core. A winding 5 produces the cross-magnetization whose flux path includes the screening 9.

FIG. 8 shows a practical application of the invention employing a well-known iron circuit adapted to actuate a contact-spring assembly comprising one common armature. The core 1 and its windings 2 and 5 are secured to yoke 15 which forms the outer magnetic return path for the operating flux on the one side. A contact-spring assembly 16 is mounted on yoke 15 and is actuated by the armature 17 likewise mounted on the yoke 15. Possible practical embodiments relating to the core 1 are shown in a sectional representation again in FIGS. 8 and *8a*. Also, the winding 5 may be applied to a ring core in the form of an annular winding as shown in FIG. *8b*.

In order to eliminate the effect of a permanent magnet which is arranged within some kind of magnetic network, it is possible to demagnetize it in the direction of the operating flux. To accomplish this, high field intensities are required when the permanent magnet acts with its flux upon an airgap, and is therefore magnetically sheared. This is also unfavorable because the demagnetization flux flows over the useful airgap of the permanent magnet. However, if the permanent magnet is designed in such a way as to be capable of being cross magnetized, no demagnetization flux needs to flow over the airgap. Moreover, only a comparatively small energization is necessary when designing the permanent magnet in a tube-shaped manner without airgaps. The winding for effecting the cross-magnetization may then, as described hereinbefore, be an annular winding surrounding the permanent magnet which is designed as a ring core. An annular or ring-shaped winding, of course, is difficult to manufacture. In cases where great currents are available for effecting the de-magnetization or cross magnetization, it can be arranged that an electrically conducting magnetic material itself is being passed through in the direction of its magnetic operating flux. In the course of this, however, it will not be possible to bring the internal ranges thereof to a sufficiently strong state of saturation. For this reason an electrically well-conducting material is used inside the hollow cylinder of the permanent magnet, which will effect the saturation. The drop of field intensity of the core-conductor flow across the wall thickness of the permanent magnet may be compensated by causing an additional flow through the cylinder of the permanent magnet.

FIG. 10 shows a cross-sectional view of a tube- or sleeve-shaped permanent magnet D having a copper current conductor located in the core. In the longitudinal direction (axial direction) a current $I_L$ flows through the core conductor L, whose magnetic field intensity is indicated in the representation by $H_L$. $H_{Li}$ is the amount of the tangential field intensity inside the permanent magnetic sleeve. $H_{La}$ is the amount of the tangential field intensity outside the permanent magnetic sleeve. The core conductor L may be insulated in a suitable way from the permanent magnetic sleeve.

In FIG. 11 in addition to the curve of the amount of the tangential field intensity originating from $I_L$, the course of a charge flowing in the permanent magnet D is shown. In accordance with a further example, this current $I_D$ passing through the longitudinal direction of the permanent magnetic sleeve, can not only be fed-in independently of $I_L$, but may also be obtained by being connected to the potential at the core conductor. In order to achieve this, D is not electrically insulated from the core conductor L, so that when suitably selecting the conductivities and dimension of the materials of D and L, there will result a suitable current division. The superposition of the field intensities originating from $I_L$ and $I_D$ will result in the curves as shown in FIG. 11. An approximately constant field intensity over the wall thickness of D is possible if the latter is not chosen too high.

FIGS. 9 and *9a* show two examples of the above-described arrangement. An opening is provided in the permanent magnet in order to accept one or more reed contacts. For reducing the current attenuation the current conductor L or L' respectively should be subdivided in a suitable way.

While I have described my invention in conjunction with specific apparatus and applications, it is to be understood that this description is made only by way of example and not as a limitation on the scope of the invention.

I claim:

1. A magnetic latching relay comprising a permanent magnet composed of a plurality of overlapping parts, said permanent magnet establishing a magnetic flux in a predetermined path, a moving armature adjacent an end of said magnet, said path including at least one air gap adapted to be bridged by said moving armature, electromagnetic means for generating flux including first and second windings, said permanent magnet being shaped along longitudinal and transverse directions to support said first and second windings, the first winding being wound as a coil in a direction perpendicular to the longitudinal direction of the permanent magnet to produce a magnetic flux along the longitudinal direction of said magnet and through said predetermined path to move said armature to bridge the associated air gap, the said permanent magnet flux holding said armature in its operated position, the second winding being wound as a coil in a direction parallel to the longitudinal direction of the permanent magnet to produce a magnetic flux directed substantially in the transverse direction, the second winding serving as a release winding through operation of its magnetic flux in the transverse direction, said transverse magnetic flux altering the direction of flux from said permanent magnet by cross-magnetization causing it to release said operated armature.

2. A magnetic latching relay as set forth in claim 1 wherein the said permanent magnet flux in said predetermined path extends axial of said magnet and the said release winding alters said flux to extend in a path transverse of said magnet, whereby said flux through the airgap is susbtantially zero.

3. A magnetic latching relay as set forth in claim 1 wherein more than one air gap is employed, each air gap lying in a common plane and wherein the flux from the said magnet responsive to its alteration by said release winding extends in a plane normal to said first plane.

4. A magnetic latching relay according to claim 1 wherein the said permanent magnet includes a thin tape of a permanent magnetic material which is wound in the shape of a hollow body.

5. A magnetic latching relay according to claim 4 wherein said air gap lies within said hollow body.

6. A magnetic latching relay according to claim 1 wherein the said permanent magnet comprises a material having a square loop hysteresis characteristic.

7. A magnetic latching relay according to claim 1 wherein the permanent magnet is included in the circuit of said release winding.

8. A magnetic latching relay as set forth in claim 1 wherein said permanent magnet comprises two sleeves which overlap to provide a multi-part magnetic structure operable like an integral magnetic body incorporating air gaps in its structure parallel to its longitudinal direction.

9. A magnetic latching relay as set forth in claim 8 wherein said second winding includes a winding coiled separately about each of said sleeves in a direction parallel to the longitudinal direction of the permanent magnet.

References Cited by the Examiner

UNITED STATES PATENTS

| | | |
|---|---|---|
| 2,992,306 | 7/1961 | Feiner. |
| 2,995,637 | 8/1961 | Feiner et al. |
| 3,134,908 | 5/1964 | Ellwood. |

BERNARD A. GILHEANY, *Primary Examiner.*

ROBERT K. SCHAEFER, *Examiner.*

G. HARRIS, JR., *Assistant Examiner.*